(12) United States Patent
Li

(10) Patent No.: US 11,877,242 B2
(45) Date of Patent: Jan. 16, 2024

(54) BANDWIDTH PART SWITCHING METHOD AND APPARATUS

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 347 days.

(21) Appl. No.: 17/285,088

(22) PCT Filed: Oct. 17, 2018

(86) PCT No.: PCT/CN2018/110698
§ 371 (c)(1),
(2) Date: Apr. 13, 2021

(87) PCT Pub. No.: WO2020/077575
PCT Pub. Date: Apr. 23, 2020

(65) Prior Publication Data
US 2021/0368448 A1 Nov. 25, 2021

(51) Int. Cl.
*H04W 52/02* (2009.01)
*H04W 72/04* (2023.01)

(52) U.S. Cl.
CPC ... *H04W 52/0235* (2013.01); *H04W 52/0212* (2013.01); *H04W 72/04* (2013.01)

(58) Field of Classification Search
CPC ......... H04W 52/0235; H04W 52/0212; H04W 72/04; H04W 52/0225; H04W 52/0216; H04W 76/28; H04W 52/02; H04W 52/0229; H04W 52/0248; H04W 52/0274; H04W 72/042; H04W 72/1257; H04W 72/23; H04W 72/535; Y02D 30/70
See application file for complete search history.

(56) References Cited

U.S. PATENT DOCUMENTS

2019/0182870 A1* 6/2019 Shih ...................... H04W 16/32
2020/0214078 A1* 7/2020 Jiang ................. H04W 52/0216
(Continued)

FOREIGN PATENT DOCUMENTS

WO 2018084145 A1 5/2018

OTHER PUBLICATIONS

62577542, Specification_Drawings_2017-10-26 (Year: 2017).*
(Continued)

*Primary Examiner* — Rushil P. Sampat
(74) *Attorney, Agent, or Firm* — Syncoda LLC; Feng Ma

(57) ABSTRACT

A method for switching a bandwidth part (BWP) can be applied to a terminal. A base station configures at least one BWP for the terminal. A power saving signal transmitted by the base station is received. The power saving signal is a wake up signaling (WUS) or a go-to-sleep signal (GTS). The BWP switching is performed based on the power saving signal. A method for switching a bandwidth part can be applied to a base station. The base station configures at least one BWP for a terminal. A power saving signal is configured for the terminal when requiring to instruct the terminal to perform the BWP switching. The power saving signal is the WUS or the GTS. The power saving signal is transmitted to the terminal, to allow the terminal to perform the BWP switching based on the power saving signal.

14 Claims, 10 Drawing Sheets

(56) References Cited

U.S. PATENT DOCUMENTS

2020/0235896 A1* 7/2020 Lee .................. H04L 5/0098
2021/0167930 A1* 6/2021 Jeon ................. H04L 5/0098
2021/0360674 A1* 11/2021 Lim ................. H04L 5/0098

OTHER PUBLICATIONS

WO_2019015458_A1 (Year: 2019).*
WO 2019059729 A1 (Year: 2019).*
International Search Report in Application No. PCT/CN2018/110698, dated Jul. 18, 2019.
Qualcomm Inc. "R1-1811283: Triggering Adaptation of UE Power Consumption Characteristics" 3GPP TSG-RAN WG1 Meeting #94bis, Oct. 12, 2018.
European Search Report for EP application 18937040.6, dated May 17, 2022.
3GPP TSG-RAN WG1 Meeting #94bis, Chengdu, China, Oct. 8-12, 2018, Source: Ericsson, Title: Triggering aspects of adaptation of NR UE power saving, Tdoc R1-1811502.
3GPP TSG-RAN WG2#101, Sanya, China, Apr. 16-20, 2018, Source: CATT, Title: Value of DRX Ambiguous Period, R2-1804486.

* cited by examiner

BANDWIDTH PART SWITCHING METHOD AND APPARATUS

CROSS-REFERENCE TO RELATED APPLICATIONS

The present application is a national stage of International Patent Application No. PCT/CN2018/110698 filed on Oct. 17, 2018, the disclosures of which is hereby incorporated by reference in its entirety.

TECHNICAL FIELD

The present disclosure generally relates to a field of communication technology, and more particularly, to a method and an apparatus for switching a bandwidth part.

BACKGROUND

In the new generation of the communication system, the bandwidth of a carrier wave may be divided into multiple Bandwidth Parts (BWPs). Multiple BWPs can be allocated to a terminal at the same time. However, there is at most one activated downlink BWP and one activated uplink BWP in the same service cell at the same time. Therefore, how to improve the efficiency of switching the BWP becomes particularly important, but there is no optimization solution for improving the efficiency of switching the BWP in the related arts.

SUMMARY

In order to overcome the problems existing in the related arts, a method and an apparatus for switching a bandwidth part are provided according to embodiments of the present disclosure.

According to a first aspect of embodiments of the present disclosure, there is provided a method for switching a bandwidth part, applied to a terminal, in which the base station configures at least one bandwidth part BWP for the terminal, the method includes:

receiving a power saving signal transmitted by the base station, the power saving signal being a wake up signaling WUS;

performing BWP switching based on the power saving signal.

Optionally, the WUS includes first information for representing a first designated BWP, in which the first designated BWP is a target BWP for switching and configured by the base station for the terminal; and performing the BWP switching based on the power saving signal includes: determining the first designated BWP for switching based on the first information; switching a currently activated BWP to the first designated BWP; and performing PDCCH monitoring and/or PDSCH monitoring on the first designated BWP.

Optionally, performing the BWP switching based on the power saving signal includes:

determining a first target BWP for switching based on a first setting rule, in which the first setting rule is transmitted by the base station to the terminal through system messages or dedicated signaling, or is specified based on a communication protocol and written in the terminal in a form of firmware;

switching a currently activated BWP to the first target BWP; and performing PDCCH monitoring and/or PDSCH monitoring on the first target BWP.

According to a second aspect of embodiments of the present disclosure, there is provided a method for switching a bandwidth part, applied to a terminal, in which the base station configures at least one bandwidth part BWP for the terminal, the method includes:

receiving a power saving signal transmitted by the base station, in which the power saving signal is a go-to-sleep signal GTS; and performing BWP switching based on the power saving signal.

Optionally, performing the BWP switching based on the power saving signal includes:

determining whether a BWP inactivity timer is in a running state when the terminal is configured with a BWP inactivity timer; and not restarting the BWP inactivity timer, and switching the currently activated BWP to a default BWP or an initial BWP upon the BWP inactivity timer expiring, when determining that the BWP inactivity timer is in a running state.

Optionally, performing the BWP switching based on the power saving signal includes:

determining whether a BWP inactivity timer is in a running state when the terminal is configured with a BWP inactivity timer; and terminating the BWP inactivity timer, determining that the BWP inactivity timer expires and switching the currently activated BWP to a default BWP or an initial BWP when determining that the BWP inactivity timer is in a running state.

Optionally, the GTS includes second information for representing a second designated BWP, in which the second designated BWP is a target BWP for returning and configured by the base station for the terminal; and performing the BWP switching based on the power saving signal includes:

determining the second designated BWP for returning based on the second information; and returning from the currently activated BWP to the second designated BWP.

Optionally, performing the BWP switching based on the power saving signal includes:

determining a second target BWP for switching based on a second setting rule when the terminal is not configured with a BWP inactivity timer, in which the second setting rule is transmitted by the base station to the terminal through system messages or dedicated signaling, or is specified based on a communication protocol and written in the terminal in a form of firmware; and returning from the currently activated BWP to the second target BWP.

Optionally, the setting rule includes at least one of the following:

the second target BWP being a default BWP;

the second target BWP being an initial BWP;

the second target BWP being an initial BWP when the terminal is not configured with the default BWP; and the second target BWP being a default BWP when the terminal is configured with the default BWP.

According to a third aspect of embodiments of the present disclosure, there is provided a method for switching a bandwidth part, applied to a base station, in which the base station configures at least one bandwidth part BWP for the terminal, the method includes:

configuring a power saving signal for the terminal when determining that it is required to instruct the terminal to perform BWP switching, the power saving signal being a wake up signaling WUS; and transmitting the power saving signal to the terminal, to allow the terminal to perform the BWP switching based on the power saving signal.

Optionally, the WUS includes first information for representing a first designated BWP, the first designated BWP being a target BWP for switching and configured by the base station for the terminal.

According to a fourth aspect of embodiments of the present disclosure, there is provided a method for switching a bandwidth part, applied to a base station, in which the base station configures at least one bandwidth part BWP fir the terminal, the method includes:

configuring a power saving signal for the terminal when determining that it is required to instruct the terminal to perform BWP switching, the power saving signal being a go-to-sleep signal GTS; and transmitting the power saving signal to the terminal, to allow the terminal to perform the BWP switching based on the power saving signal.

Optionally, the GTS includes second information for representing a second designated BWP, in which the second designated BWP is a target BWP for returning and configured by the base station for the terminal.

According to a fifth aspect of embodiments of the present disclosure, there is provided an apparatus for switching a bandwidth part, applied to a terminal, in which the base station configures at least one bandwidth part BWP for the terminal, the apparatus includes:

a first receiving module, configured to receive a power saving signal transmitted by the base station, in which the power saving signal is a wake up signaling WUS; and a first switching module, configured to perform BWP switching based on the power saving signal.

Optionally, the WUS includes first information for representing a first designated BWP, in which the first designated BWP is a target BWP for switching and configured by the base station for the terminal, the first switching module includes:

a first determining submodule, configured to determine the first designated BWP for switching based on the first information;

a first switching submodule, configured to switch from a currently activated BWP to the first designated BWP; and a first monitoring submodule, configured to perform PDCCH monitoring and/or PDSCH monitoring on the first designated BWP.

Optionally, the first switching module includes:

a second determining submodule, configured to determine a first target BWP for switching based on a first setting rule, in which the first setting rule is transmitted by the base station to the terminal through system messages or dedicated signaling, or is specified based on a communication protocol and written in the terminal in a form of firmware;

a second switching submodule, configured to switch from a currently activated BWP to the first target BWP; and a second monitoring submodule, configured to perform PDCCH monitoring and/or PDSCH monitoring on the first target BWP.

According to a sixth aspect of embodiments of the present disclosure, there is provided an apparatus for switching a bandwidth part, applied to a terminal, in which a base station configures at least one bandwidth part BWP for the terminal, the apparatus includes:

a second receiving module, configured to receive a power saving signal transmitted by the base station, in which the power saving signal is a go-to-sleep signal GTS; and a second switching module, configured to perform BWP switching based on the power saving signal.

Optionally, the second switching module includes:

a first judging submodule, configured to determine whether a BWP inactivity timer is in a running state when the terminal is configured with the BWP inactivity timer; and a third switching submodule, configured to not restart the BWP inactivity timer, and return the currently activated BWP to a default BWP or an initial BWP upon the BWP inactivity timer expiring when determining that the BWP inactivity timer is in a running state.

Optionally, the second switching module includes:

a second judging submodule, configured to determine whether a BWP inactivity timer is in a running state when the terminal is configured with the BWP inactivity timer; and a fourth switching submodule, configured to terminate the BWP inactivity timer, determine that the BWP inactivity timer expires, and switch the currently activated BWP to a default BWP or an initial BWP when determining that the BWP inactivity timer is in a running state.

Optionally, the GTS includes second information for representing a second designated BWP, in which the second designated BWP is a target BWP for returning and configured by the base station for the terminal; the second switching module includes:

a third determining submodule, configured to determine the second designated BWP for returning based on the second information; and a fifth switching submodule, configured to return from the currently activated BWP to the second designated BWP.

Optionally, the second switching module includes:

a fourth determining submodule, configured to determine a second target BWP for returning based on a second setting rule when the terminal is not configured with a BWP inactivity timer, in which the second setting rule is transmitted by the base station to the terminal through system messages or dedicated signaling, or is specified based on a communication protocol and written in the terminal in a form of firmware; and a sixth switching submodule, configured to return from the currently activated BWP to the second target BWP.

Optionally, the setting rule includes at least one of the following:

the second target BWP being a default BWP;

the second target BWP being an initial BWP;

the second target BWP being an initial BWP when the terminal is not configured with the default BWP; and the second target BWP being a default BWP when the terminal is configured with the default BWP.

According to a seventh aspect of embodiments of the present disclosure, there is provided an apparatus for switching a bandwidth part, in which a base station configures at least one bandwidth part BWP for a terminal, the apparatus includes:

a first configuring module, configured to configure a power saving signal for the terminal when determining that it is required to instruct the terminal to perform BWP switching, the power saving signal being a wake up signaling WUS; and a first transmitting module, configured to transmit the power saving signal to the terminal, to allow the terminal to perform the BWP switching based on the power saving signal.

Optionally, the WUS includes first information for representing a first designated BWP, in which the first designated BWP is a target BWP for switching and configured by the base station for the terminal.

According to an eighth aspect of embodiments of the present disclosure, there is provided an apparatus for switching a bandwidth part, in which the base station configures at least one bandwidth part BWP for the terminal, the apparatus includes:

a second configuring module, configured to configure a power saving signal for the terminal when determining that it is required to instruct the terminal to perform BWP switching, in which the power saving signal is a go-to-sleep signal GTS; and a second transmitting module, configured to transmit the power saving signal to the terminal, to allow the terminal to perform the BWP switching based on the power saving signal.

Optionally, the GTS includes second information for representing a second designated BWP, in which the second designated BWP is a target BWP for returning and configured by the base station for the terminal.

According to a ninth aspect of the embodiments of the present disclosure, there is provided a non-transitory computer-readable storage medium having computer programs stored thereon. The computer programs are configured to execute a method for switching a bandwidth part according to the first aspect.

According to a tenth aspect of the embodiments of the present disclosure, there is provided a non-transitory computer-readable storage medium having computer programs stored thereon. The computer programs are configured to execute a method for switching a bandwidth part according to the second aspect.

According to an eleventh aspect of the embodiments of the present disclosure, there is provided a non-transitory computer-readable storage medium having computer programs stored thereon. The computer programs are configured to execute a method for switching a bandwidth part according to the third aspect.

According to a twelfth aspect of the embodiments of the present disclosure, there is provided a non-transitory computer-readable storage medium having computer programs stored thereon. The computer programs are configured to execute a method for switching a bandwidth part according to the fourth aspect.

According to a thirteenth aspect of embodiments of the present disclosure, there is provided an apparatus for switching a bandwidth part, applied to a terminal, in which a base station configures at least one bandwidth part BWP for the terminal, the apparatus includes:

a processor;
a memory configured to store instructions executable by the processor;
in which, the processor is configured to:
receive a power saving signal transmitted by the base station, in which the power saving signal is a wake up signaling WUS; and
perform BWP switching based on the power saving signal.

According to a fourteenth aspect of embodiments of the present disclosure, there is provided an apparatus for switching a bandwidth part, applied to a terminal, in which the base station configures at least one bandwidth part BWP for the terminal, the apparatus includes:

a processor;
a memory configured to store instructions executable by the processor;
in which, the processor is configured to:
receive a power saving signal transmitted by the base station, in which the power saving signal is a go-to-sleep signal GTS; and
perform BWP switching based on the power saving signal.

According to a fifteenth aspect of embodiments of the present disclosure, there is provided an apparatus for switching a bandwidth part, applied to a base station, in which the base station configures at least one bandwidth part BWP for the terminal, the apparatus includes:

a processor;
a memory configured to store instructions executable by the processor;
in which, the processor is configured to:
configure a power saving signal for the terminal when determining that it is required to instruct the terminal to perform BWP switching, in which the power saving signal is a wake up signaling WUS; and
transmit the power saving signal to the terminal, to allow the terminal to perform the BWP switching based on the power saving signal.

According to a sixteenth aspect of embodiments of the present disclosure, there is provided an apparatus for switching a bandwidth part, applied to a base station, in which the base station configures at least one bandwidth part BWP for the terminal, the apparatus includes:

a processor;
a memory configured to store instructions executable by the processor;
in which, the processor is configured to:
configure a power saving signal for the terminal when determining that it is required to instruct the terminal to perform BWP switching, in which the power saving signal is a go-to-sleep signal GTS; and
transmit the power saving signal to the terminal, to allow the terminal to perform the BWP switching based on the power saving signal.

The technical solutions provided by the embodiments of the present disclosure may include the following beneficial effects.

By receiving the power saving signal transmitted by the base station, in which the power saving signal may be the wake up signaling WUS or the go-to-sleep signal GTS, the terminal may perform the BWP switching based on the power saving signal. Therefore, the function of performing the BWP switching based on the power saving signal configured by the base station is realized, the rate of the BWP switching is improved, and the power consumption of the BWP switching is reduced.

When it is determined that there is a need to instruct the terminal to perform the BWP switching, the base station can configure the power saving signal for the terminal, in which the power saving signal may be the wake up signaling WUS or the go-to-sleep signal GTS, the terminal transmits the power saving signal to the terminal. The terminal may perform the BWP switching based on the power saving signal transmitted by the base station. Therefore, the function of performing the BWP switching based on the power saving signal configured by the base station is realized, the rate of the BWP switching is improved, and the power consumption of the BWP switching is reduced.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms in the present disclosure are only for the purpose of describing specific embodiments, and are not restrictive of the present disclosure. The singular forms "a", "the" and "this" in the present disclosure and appended claims are also intended to include plural forms, unless the context clearly indicates other meanings. It is to be understood that the term "and/or" in the disclosure refers to and includes any or all possible combinations of one or more associated listed items.

It is to be understood that although the terms first, second, third, etc. may be adopted in the disclosure to describe various information, the information is not limited to these terms. These terms are only used to distinguish information of the same type from each other. For example, without departing from the scope of the present disclosure, first information may also be referred to as second information, and similarly, second information may also be referred to as first information. Depending on the context, the word "if" as used herein can be interpreted as "when", "upon" or "in response to determining".

Figure 1:
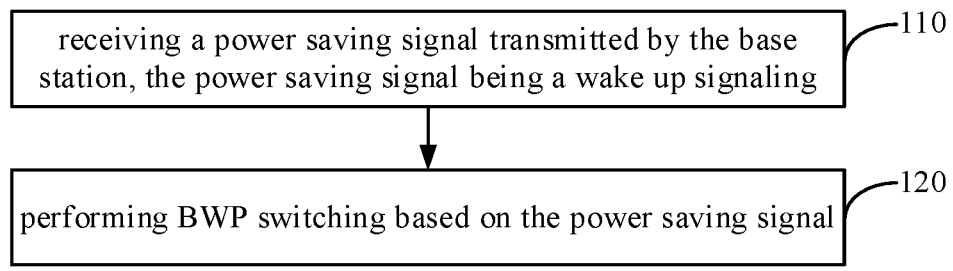
FIG. 1 is a flow chart illustrating a method for switching a bandwidth part according to an exemplary embodiment.
Figure 2:
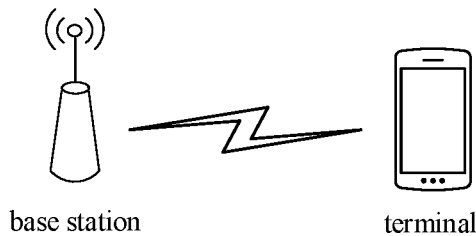
FIG. 2 is a schematic diagram illustrating an application scenario of a method for switching a bandwidth part according to an exemplary embodiment.

FIG. 1 is a flow chart illustrating a method for switching a bandwidth part according to an exemplary embodiment. FIG. 2 is a schematic diagram illustrating an application scenario of a method for switching a bandwidth part according to an exemplary embodiment. The method for switching a bandwidth part may be applied to a terminal. A base station may be configured to configure at least one BWP for the terminal. As illustrated in FIG. 1, the method may include the following steps 110-120.

In step 110, a power saving signal transmitted by a base station is received. The power saving signal is a wake up signaling (WUS).

In some embodiments of the present disclosure, when determining that it is required to instruct the terminal to perform BWP switching, the base station may transmit the power saving signal to the terminal. The power saving signal may be the WUS. After receiving the power saving signal for instructing to perform the BWP switching, the terminal may perform the BWP switching based on the power saving signal.

The WUS is a type of power saving signal introduced by the new radio (NR) communication system. The WUS may be a detection signal of low power consumption. Detecting the WUS by the terminal means that the PDCCH is monitored continually; otherwise, there is no need to monitor the PDCCH continually.

In step 120, the BWP switching is performed based on the power saving signal.

In some embodiments of the present disclosure, performing the BWP switching based on the power saving signal may include switching a currently activated BWP to another BWP. The terminal may determine the BWP to which the currently activated BWP is switched based on actual situation.

In an exemplary scenario, as illustrated in FIG. 2, a base station and a terminal are included. When determining that there is a need to instruct the terminal to perform the BWP switching, the base station may configure the power saving signal (e.g., WUS) for the terminal and transmit the configured power saving signal (e.g., WUS) to the terminal. After receiving the power saving signal (e.g., WUS), the terminal may perform the BWP switching based on the power saving signal (e.g., WUS).

It can be seen from the embodiments, by receiving the power saving signal transmitted by the base station, in which the power saving signal is the WUS, and by performing the BWP switching based on the power saving signal, a function of performing the BWP switching based on the power saving signal that is configured by the base station is achieved, the rate of the BWP switching is improved and the power consumption of the BWP switching is reduced.

Figure 3:
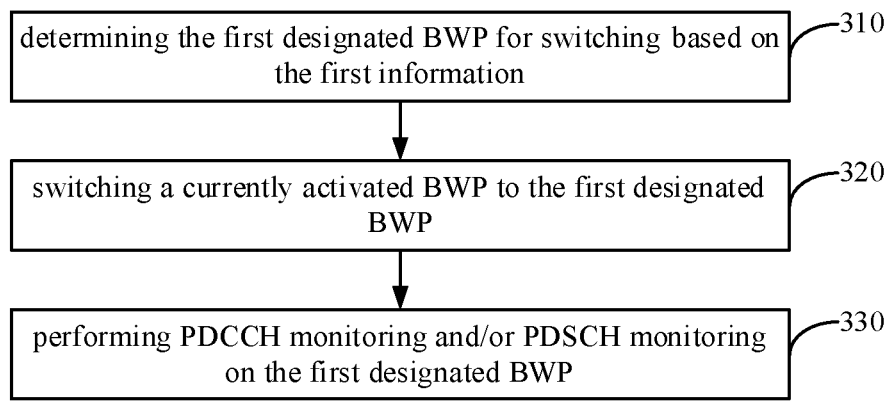
FIG. 3 is a flow chart illustrating another method for switching a bandwidth part according to an exemplary embodiment.

FIG. 3 is a flow chart illustrating another method for switching a bandwidth part according to an exemplary embodiment. The method for switching a bandwidth part may be applied to a terminal. The method is based on the method illustrated in FIG. 1. The power saving signal is the WUS. The WUS includes first information for representing a first designated BWP. The first designated BWP is a target BWP for switching and configured by the base station for the terminal. When executing the step 120, as illustrated in FIG. 3, the following steps 310-330 may be included.

In step 310, a first designated BWP for switching is determined based on the first information.

In some embodiments of the present disclosure, since the first information is configured to represent the first designated BWP, the terminal may determine the target BWP for switching and configured by the base station based on the first information after acquiring the first information.

In step 320, a currently activated BWP is switched to the first designated BWP.

In some embodiments of the present disclosure, the terminal may switch the currently activated BWP to a BWP designated by the base station based on the configuration from the base station. For example, the currently activated BWP is BWP1 and the first designated BWP is BWP2. In this case, the terminal may switch the BWP1 to the BWP2 based on the instruction from the base station.

In step 330, physical downlink control channel (PDCCH) monitoring and/or physical downlink shared channel (PDSCH) monitoring is performed on the first designated BWP.

In some embodiments of the present disclosure, since the WUS is a detection signal of low power consumption, the PDCCH monitoring may be continually performed when the terminal detects the WUS. After the terminal performs the BWP switching, the PDCCH monitoring and/or the PDSCH monitoring may be continually performed on the BWP to which the currently activated BWP is switched.

It can be seen from the embodiments, when the power saving signal is the WUS and the WUS includes the first information for representing the first designated BWP, the first designated BWP for switching may be determined based on the first information, the currently activated BWP may be switched to the first designated BWP, and the PDCCH monitoring and/or the PDSCH monitoring may be performed on the first designated BWP. Therefore, the function of switching the currently activated BWP to the BWP designated by the base station based on the configuration from the base station may be realized and the accuracy of the BWP switching may be improved.

Figure 4:
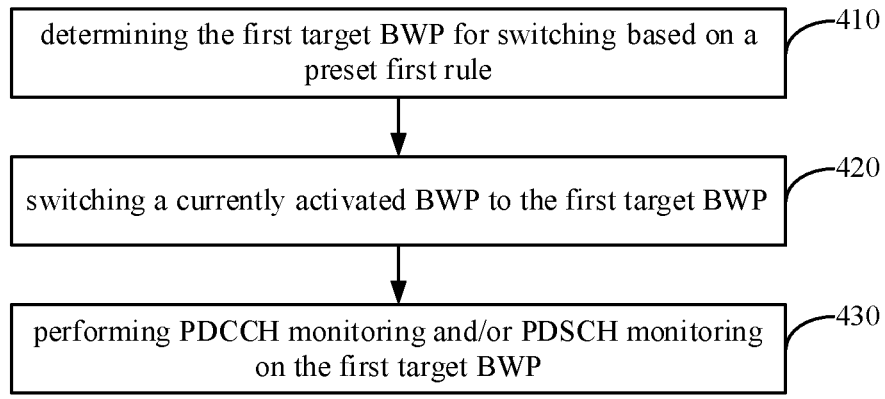
FIG. 4 is a flow chart illustrating another method for switching a bandwidth part according to an exemplary embodiment.

FIG. 4 is a flow chart illustrating another method for switching a bandwidth part according to an exemplary embodiment. The method for switching a bandwidth part may be applied to a terminal. The method is based on the method illustrated in FIG. 1. The power saving signal is the WUS. When executing the step 120, as illustrated in FIG. 4, the following steps 410-430 may be included.

In step 410, a first target BWP for switching is determined based on a first setting rule.

In some embodiments of the present disclosure, when the power saving signal is the WUS and the WUS includes the first information for representing the first designated BWP, in which the first designated BWP is the target BWP for switching and configured by the base station for the terminal, the first designated BWP for switching may be determined preferentially based on the first information. In a case where the first information is not included in the WUS, the terminal may determine the first target BWP for switching based on the first setting rule. The first setting rule may be transmitted by the base station to the terminal through system messages or dedicated signaling, or is specified based on a communication protocol and written in the terminal in a form of firmware.

In step 420, the currently activated BWP is switched to the first target BWP.

In some embodiments of the present disclosure, the terminal may switch the currently activated BWP to the first target BWP that is determined based on the first setting rule. For example, the currently activated BWP is BWP1 and the first target BWP is BWP3. In this case, the terminal may switch the BWP1 to the BWP3.

In step 430, PDCCH monitoring and/or PDSCH monitoring are performed on the first target BWP.

It can be seen from the embodiments, when the power saving signal is the WUS and the WUS does not include the first information for representing the first designated BWP, the first target BWP for switching may be determined based on the preset first ule, the currently activated BWP may be switched to the first target BWP, and the PDCCH monitoring and/or the PDSCH monitoring may be performed on the first target BWP. Therefore, the reliability of BWP switching may be improved.

Figure 5:
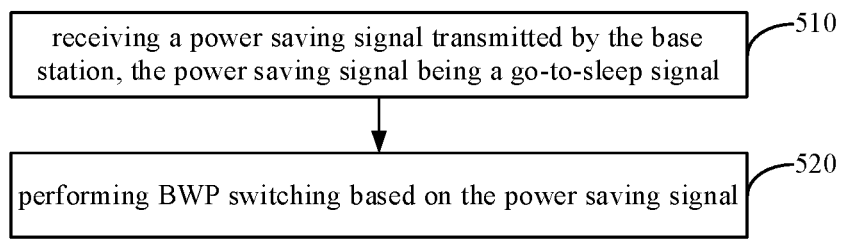
FIG. 5 is a flow chart illustrating a method for switching a bandwidth part according to an exemplary embodiment.

FIG. 5 is a flow chart illustrating a method for switching a bandwidth part according to an exemplary embodiment. The method for switching a bandwidth part may be applied to a terminal. A base station may configure at least one bandwidth part BWP for the terminal. As illustrated in FIG. 5, the method may include the following steps 510-520.

In step 510, a power saving signal transmitted by a base station is received. The power saving signal is a go-to-sleep signal (GTS).

In some embodiments of the present disclosure, when determining that it is required to instruct the terminal to perform the BWP switching, the base station may transmit the power saving signal to the terminal. The power saving signal may be the GTS. After receiving the power saving signal for instructing to perform the BWP switching, the terminal may perform the BWP switching based on the power saving signal.

The GTS is a type of power saving signal introduced by the new radio (NR) communication system. The GTS is to instruct the terminal to quickly enter a sleep state.

In step 520, the BWP switching is performed based on the power saving signal.

In some embodiments of the present disclosure, performing the BWP switching based on the power saving signal may include switching a currently activated BWP to another BWP. The terminal may determine the BWP to which the currently activated BWP is switched to based on actual situations.

It can be seen from the embodiments, by receiving the power saving signal transmitted by the base station, in which the power saving signal is the GTS, and by performing the BWP switching based on the power saving signal, the function of performing the BWP switching based on the power saving signal that is configured by the base station may be achieved, the rate of the BWP switching may be improved and the power consumption of the BWP switching may be reduced.

Figure 6:
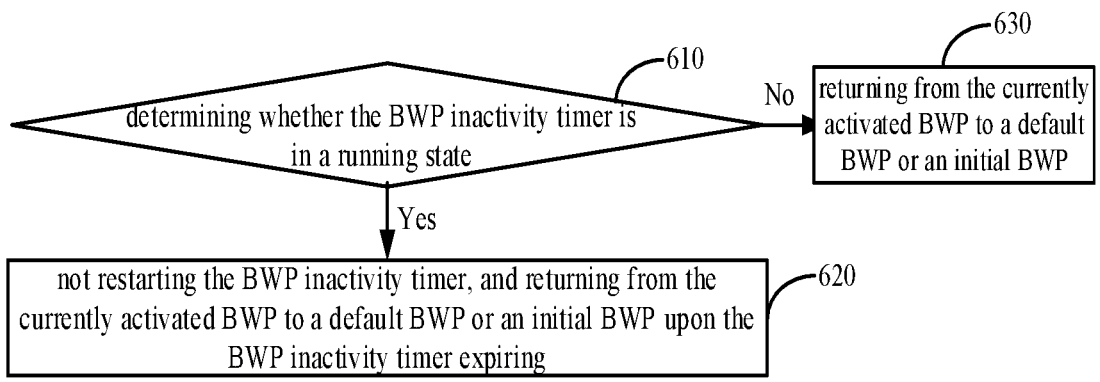
FIG. 6 is a flow chart illustrating another method for switching a bandwidth part according to an exemplary embodiment.

FIG. 6 is a flow chart illustrating another method for switching a bandwidth part according to an exemplary embodiment. The method for switching a bandwidth part may be applied to a terminal. The method is based on the method illustrated in FIG. 5. The power saving signal is the GTS. The method may be applied to a scenario where the terminal is configured with a BWP inactivity timer. When executing the step 520, as illustrated in FIG. 6, the following steps 610-630 may be included.

In step 610, it is determined whether the BWP inactivity timer is in a running state when the terminal is configured with a BWP inactivity timer. If the BWP inactivity timer is in a running state, the step 620 is executed. If the BWP inactivity timer is not in a running state, the step 630 is executed.

In some embodiments of the present disclosure, in a case where the terminal is configured with a BWP inactivity timer, the terminal may determine whether the BWP inactivity timer is in a running state when receiving the GTS. In a case that the BWP inactivity timer is in a running state, the BWP switching is performed upon the BWP inactivity timer expiring. In a case that the BWP inactivity timer is not in a running state, the BWP switching is performed directly.

In addition, the terminal may be configured with a BWP inactivity timer, which means that a function of automatically returning to a default BWP or an initial BWP is activated. The terminal may be not configured with a BWP inactivity timer, which means that a function of automatically returning from the currently activated BWP to a default BWP or an initial BWP is not activated.

The function of automatically returning to a default BWP or an initial BWP may include the following. When the currently activated BWP is inactive for a period of time, the BWP inactivity timer may be started, and the terminal may automatically return from the currently activated BWP to the default BWP upon the BWP inactivity timer expiring. When the terminal is not configured with the default BWP, the terminal may automatically return to the initial BWP. The default BWP may be a small BWP specified by the base station for the terminal in consideration of power saving.

In step 620, the BWP inactivity timer is not restarted, and the terminal returns from the currently activated BWP to the default BWP or the initial BWP upon the BWP inactivity timer expiring.

In step 630, the terminal returns from the currently activated BWP to the default BWP or the initial BWP.

In the steps 620 and 630, returning from the currently activated BWP to the default BWP or the initial BWP may include returning from the currently activated BWP to the default BWP preferentially, or automatically returning to the initial BWP in a case that the terminal is not configured with the default BWP.

It can be seen from the embodiments, when the power saving signal is the GTS and the terminal is configured with the BWP inactivity timer, it may be determined whether the BWP inactivity timer is in a running state. In a case that the BWP inactivity timer is in a running state, the BWP inactivity timer is not restarted, and the terminal returns from the currently activated BWP to the default BWP or the initial BWP upon the BWP inactivity timer expiring. In a case that the BWP inactivity timer is not in a running state, the terminal returns from the currently activated BWP to the default BWP or the initial BWP. Therefore, the BWP switching is achieved in the scenario that the terminal is configured with the BWP inactivity timer, and the practicality of the BWP switching is improved.

Figure 7:
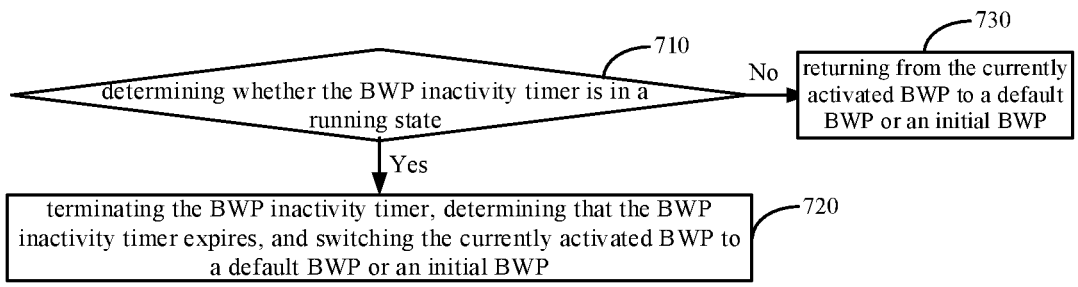
FIG. 7 is a flow chart illustrating another method for switching a bandwidth part according to an exemplary embodiment.

FIG. 7 is a flow chart illustrating another method for switching a bandwidth part according to an exemplary embodiment. The method for switching a bandwidth part may be applied to a terminal. The method is based on the method illustrated in FIG. 5. The power saving signal is a GTS. The method may be applied to a scenario where a BWP inactivity timer is configured for the terminal. When executing the step 520, as illustrated in FIG. 7, the following steps 710-730 may be included.

In step 710, it is determined whether the BWP inactivity timer is in a running state when a BWP inactivity timer is configured for the terminal. In a case that the BWP inactivity timer is in a running state, the step 720 may be executed. In a case that the BWP inactivity timer is not in a running state, the step 730 may be executed.

In step 720, the BWP inactivity timer is terminated, and the BWP inactivity timer expires such that the terminal returns from the currently activated BWP to a default BWP or an initial BWP.

In step 730, the terminal returns from the currently activated BWP to a default BWP or an initial BWP.

In the steps 720 and 730, returning from the currently activated BWP to a default BWP or an initial BWP may include returning from the currently activated BWP to the default BWP preferentially, or returning from the currently activated BWP to the initiated BWP automatically in a case where the default BWP is not configured for the terminal.

It can be seen from the embodiments, when the power saving signal is the GTS and a BWP inactivity timer is configured for the terminal, it may be determined whether the BWP inactivity timer is in a running state firstly. In a case that the BWP inactivity timer is in a running state, the BWP inactivity timer may be terminated, and the terminal may return from the currently activated BWP to the default BWP or the initial BWP. In a case that the BWP inactivity timer is not in a running state, the terminal may return the currently activated BWP to the default BWP or the initial BWP. Therefore, the implementation of the BWP switching is expanded, thereby meeting different individual requirements of the BWP switching.

Figure 8:
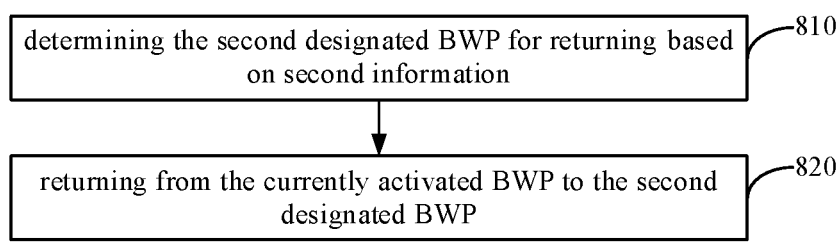
FIG. 8 is a flow chart illustrating another method for switching a bandwidth part according to an exemplary embodiment.

FIG. 8 is a flow chart illustrating another method for switching a bandwidth part according to an exemplary embodiment. The method for switching a bandwidth part may be applied to a terminal. The method is based on the method illustrated in FIG. 5. The power saving signal is a GTS. The method may be applied to a scenario where a BWP inactivity timer is not configured for the terminal. The GTS includes second information for representing a second designated BWP. The second designated BWP is a target BWP for returning and configured by the base station for the terminal. When executing the step 520, as illustrated in FIG. 8, the following steps 810-820 may be included.

In step 810, a second designated BWP for returning is determined based on the second information.

In some embodiments of the present disclosure, since second information is configured to represent the second designated BWP, the terminal may determine which one is the target BWP for returning and configured by the base station based on the second information after acquiring the second information.

In some embodiments, the terminal is configured with a BWP inactivity timer. In a case where the GTS received by the terminal and transmitted by the base station includes the second information for representing the second designated BWP, in which the second designated BWP is a target BWP for returning and configured by the base station for the terminal, the terminal may still perform the returning based on the target BWP indicated by the GTS.

In some embodiments, the terminal is not configured with a BWP inactivity timer. In a case where the GTS received by the terminal and transmitted by the base station includes the second information for representing the second designated BWP, in which the second designated BWP is a target BWP for returning and configured by the base station for the terminal, the terminal may perform the returning based on the target BWP indicated by the GTS.

In step 820, the terminal returns from the currently activated BWP to the second designated BWP.

In some embodiments of the present disclosure, the terminal may return the currently activated BWP to a BWP designated by the base station based on the configuration from the base station. For example, the currently activated BWP is BWP1 and the second designated BWP is a default BWP. The terminal may switch the BWP1 to the default BWP based on the instruction from the base station. The default BWP may be a small BWP specified by the base station for the terminal in consideration of power saving.

It can be seen from the embodiments, when the power saving signal is the GTS and the GTS includes the second information for representing the second designated BWP, the second designated BWP for returning may be determined based on the second information, and the terminal may return from the currently activated BWP to the second designated BWP. Therefore, a function of returning from the currently activated BWP to a BWP designated by the base station based on the configuration from the base station may be achieved and the reliability of the BWP switching may be improved.

Figure 9:
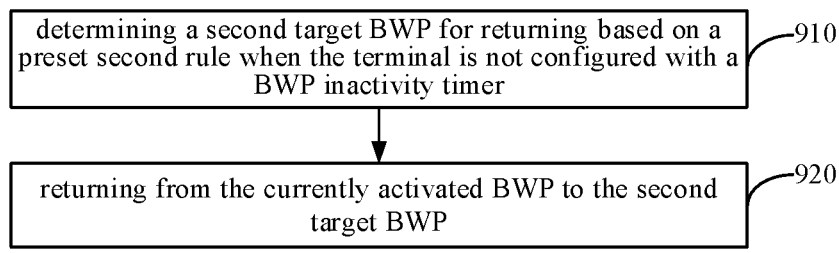
FIG. 9 is a flow chart illustrating another method for switching a bandwidth part according to an exemplary embodiment.

FIG. 9 is a flow chart illustrating another method for switching a bandwidth part according to an exemplary embodiment. The method for switching a bandwidth part may be applied to a terminal. The method is based on the method illustrated in FIG. 5. The power saving signal is a GTS. The method may be applied to a scenario where the terminal is not configured with a BWP inactivity timer. When executing the step 520, as illustrated in FIG. 9, the following steps 910-920 may be included.

In step 910, when the terminal is not configured with a BWP inactivity timer, a second target BWP for returning is determined based on a second setting rule.

In some embodiments of the present disclosure, when the terminal is not configured with a BWP inactivity timer and the GTS does not include the second information for representing the second designated BWP, in which the second designated BWP is a target BWP for returning and configured by the base station for the terminal, the terminal may determine the second target BWP for returning based on the second setting rule. The second setting rule may be transmitted by the base station to the terminal through system messages or dedicated signaling, or is specified based on a communication protocol and written in the terminal in a form of firmware.

In some embodiments, the second setting rule may include at least one of the following: the second target BWP being a default BWP; the second target BWP being an initial BWP; the second target BWP being an initial BWP when the terminal is not configured with the default BWP; and the second target BWP being a default BWP when the terminal is configured with the default BWP.

In step 920, the terminal returns from a currently activated BWP to the second target BWP.

It can be seen from the embodiments, when the terminal is not configured with the BWP inactivity timer, the second target BWP for returning may be determined based on the second setting rule. For example, the second setting rule may be transmitted by the base station to the terminal through system messages or dedicated signaling, or is specified based on the communication protocol and written in the terminal in the form of firmware. The terminal returns from the currently activated BWP to the second target BWP. Therefore, the BWP switching is achieved in a scenario where the terminal is not configured with a BWP inactivity timer, thereby expanding the application scope of the BWP switching.

Figure 10:
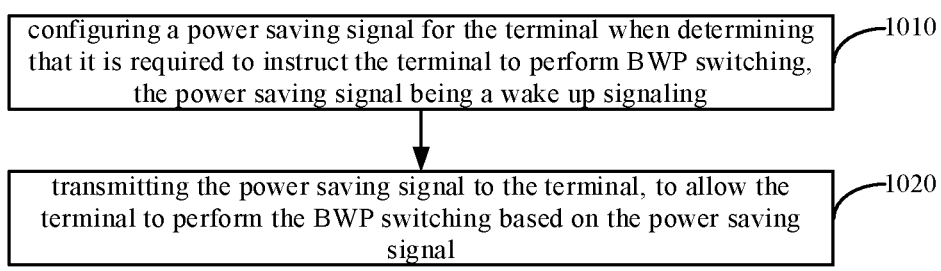
FIG. 10 is a flow chart illustrating a method for switching a bandwidth part according to an exemplary embodiment.

FIG. 10 is a flow chart illustrating a method for switching a bandwidth part according to an exemplary embodiment. The method for switching a bandwidth part may be applied to a base station. The base station is configured to configure at least one BWP for a terminal. As illustrated in FIG. 10, the method may include the following steps 1010-1020.

In step 1010, a power saving signal is configured for the terminal when it is required to instruct the terminal to perform the BWP switching. The power saving signal is a wake up signaling (WUS).

In some embodiments of the present disclosure, when determining that it is required to instruct the terminal to perform the BWP switching, the base station may transmit the power saving signal to the terminal. The power saving signal may be the WUS. After receiving the power saving signal, the terminal may perform the BWP switching based on the power saving signal.

In some embodiments, the WUS may include first information for representing a first designated BWP. The first designated BWP is a target BWP for switching and configured by the base station for the terminal. When the base station determines to instruct the terminal to perform the BWP switching, the base station may instruct that the target BWP for switching is the first designated BWP. Therefore, the terminal may easily return from the currently activated BWP to the first designated BWP instructed by the base station based on the configuration from the base station.

In step 1020, the power saving signal is transmitted to the terminal, and the terminal may perform the BWP switching based on the power saving signal.

It can be seen from the embodiments, when determining that it is required to instruct the terminal to perform the BWP switching, the power saving signal may be configured for the terminal. The power saving signal is the WUS. The power saving signal is transmitted to the terminal, and the terminal may perform the BWP switching based on the power saving signal that is transmitted by the base station. Therefore, the function of performing the BWP switching based on the power saving signal that is configured by the base station may be achieved, the rate of the BWP switching may be improved and the power consumption of the BWP switching may be reduced.

Figure 11:
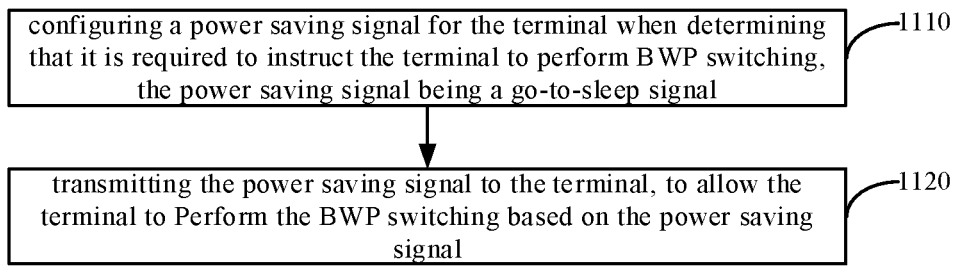
FIG. 11 is a flow chart illustrating a method for switching a bandwidth part according to an exemplary embodiment.

FIG. 11 is a flow chart illustrating a method for switching a bandwidth part according to an exemplary embodiment. The method for switching a bandwidth part may be applied to a base station. The base station configures at least one BWP for a terminal. As illustrated in FIG. 11, the method may include the following steps 1110-1120.

In step 1110, a power saving signal is configured for the terminal when determining that it is required to instruct the terminal to the perform BWP switching. The power saving signal is a go-to-sleep signal GTS.

In some embodiments of the present disclosure, when the base station determines to instruct the terminal to perform the BWP switching, the base station may transmit the power saving signal to the terminal. The power saving signal may be the GTS. After the terminal receives the power saving signal, the terminal device may perform the BWP switching based on the power saving signal.

In some embodiments, the GTS includes second information for representing a second designated BWP. The second designated BWP is a target BWP for returning and configured by the base station for the terminal. When the base station determines to instruct the terminal to perform the BWP switching, the base station may instruct that the target BWP for returning is the second designated BWP. Therefore, the terminal may easily return from the currently activated BWP to the second designated BWP instructed by the base station based on the configuration from the base station.

In step 1120, the power saving signal is transmitted to the terminal and the terminal may perform the BWP switching based on the power saving signal.

It can be seen from some embodiments that the power saving signal may be configured for the terminal when determining that it is required to instruct the terminal to perform the BWP switching. The power saving signal is the GTS. The power saving signal is transmitted to the terminal. The terminal may perform the BWP switching based on the power saving signal transmitted by the base station. Therefore, the function of performing the BWP switching based on the power saving signal configured by the base station may be achieved, the rate of the BWP switching is improved and the power consumption of the BWP switching is reduced.

Corresponding to the foregoing embodiments of the method for switching a bandwidth part, the present disclosure also provides embodiments of the apparatus for switching a bandwidth part.

Figure 12:
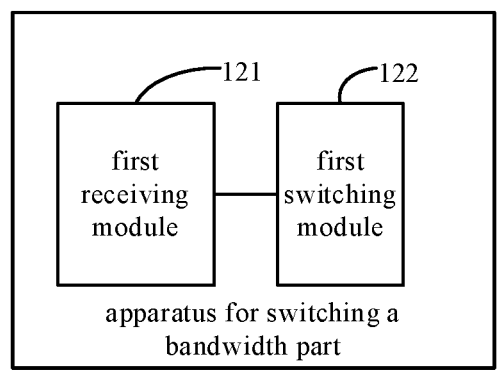
FIG. 12 is a block diagram illustrating an apparatus for switching a bandwidth part according to an exemplary embodiment.

FIG. 12 is a block diagram illustrating an apparatus for switching a bandwidth part according to an exemplary embodiment. The apparatus may be applied to a terminal. A base station may be configured to configure at least one BWP to the terminal. The apparatus may be configured to execute the method for switching a bandwidth part as illustrated in FIG. 1. As illustrated in FIG. 12, the apparatus may include a first receiving module 121 and a first switching module 122.

The first receiving module 121 is configured to receive a power saving signal transmitted by the base station. The power saving signal is a wake up signaling WUS.

The first switching module 122 is configured to perform BWP switching based on the power saving signal.

It can be seen from the embodiments, by receiving the power saving signal transmitted by the base station, in which the power saving signal is the WUS, and by performing the BWP switching based on the power saving signal, the function of performing the BWP switching based on the power saving signal configured by the base station is achieved, the rate of the BWP switching improved, and the power consumption of the BWP switching is reduced.

Figure 13:
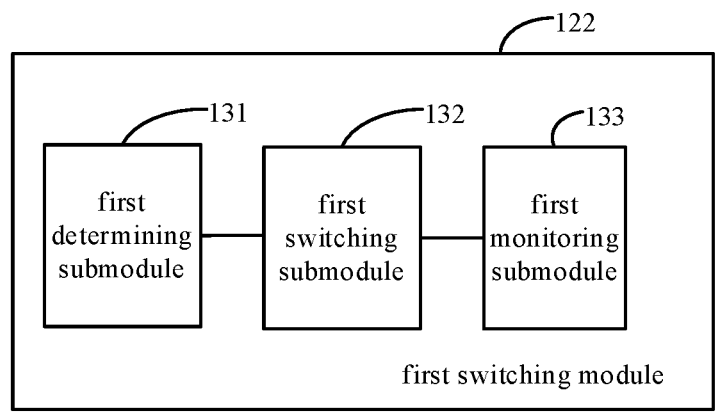
FIG. 13 is a block diagram illustrating another apparatus for switching a bandwidth part according to an exemplary embodiment.

In some embodiments, based on the apparatus illustrated in FIG. 12, as illustrated in FIG. 13, the power saving signal is the WUS and the WUS includes first information for representing a first designated BWP. The first designated BWP is a target BWP for switching and configured by the base station for the terminal. The first switching module 122 includes a first determining submodule 131, a first switching submodule 132 and a first monitoring submodule 133.

The first determining submodule 131 is configured to determine the first designated BWP for switching based on the first information;

the first switching submodule 132 is configured to switch a currently activated BWP to the first designated BWP.

the first monitoring submodule 133 is configured to perform PDCCH monitoring and/or PDSCH monitoring on the first target BWP.

It can be seen from the embodiments, when the power saving signal is the WUS and the WUS includes the first information for representing the first designated BWP, the first designated BWP for switching may be determined based on the first information, the terminal may switch the currently activated BWP to the first designated BWP, and the PDCCH monitoring and/or PDSCH monitoring may be performed on the first designated BWP. Therefore, the function of switching the currently activated BWP to a BWP designated by the base station based on the configuration from the base station is realized and the accuracy of the BWP switching is improved.

Figure 14:
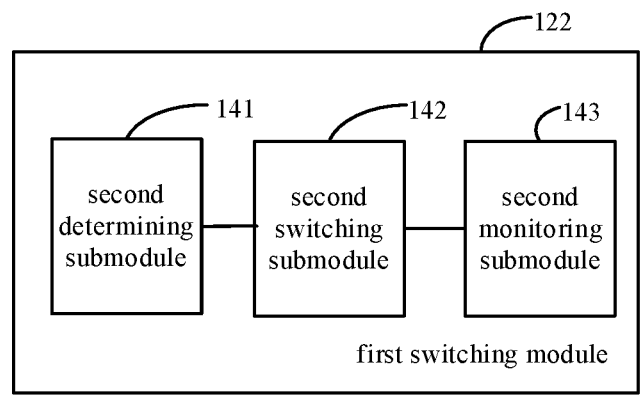
FIG. 14 is a block diagram illustrating another apparatus for switching a bandwidth part according to an exemplary embodiment.

In some embodiments, based on the apparatus illustrated in FIG. 12, as illustrated in FIG. 14, the power saving signal is the WUS and the first switching module 122 may include a second determining submodule 141, a second switching submodule 142 and a second monitoring submodule 143.

The second determining submodule 141 is configured to determine a first target BWP for switching based on a first setting rule. The first setting rule is transmitted by the base station to the terminal through system messages or dedicated signaling, or is specified based on a communication protocol and written in the terminal in a form of firmware.

The second switching submodule 142 is configured to switch a currently activated BWP to the first target BWP.

The second monitoring submodule 143 is configured to perform PDCCH monitoring and/or PDSCH monitoring on the first target BWP.

It can be seen from the embodiments, when the power saving signal is the WUS and the WUS does not include the first information for representing the first designated BWP, the first target BWP for switching may be determined based on the first setting rule, the currently activated BWP may be switched to the first target BWP, and the PDCCH monitoring and/or the PDSCH monitoring may be performed on the first target BWP. Therefore, the reliability of the BWP switching is improved.

Figure 15:
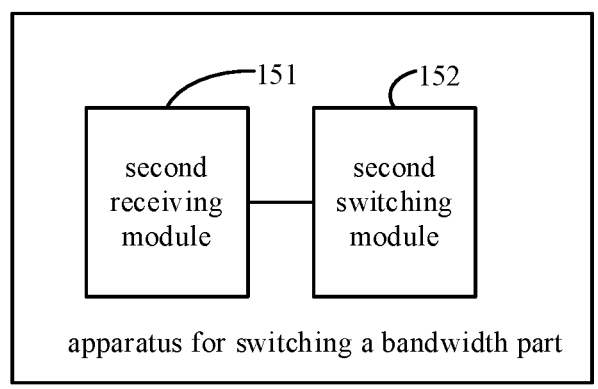
FIG. 15 is a block diagram illustrating an apparatus for switching a bandwidth part according to an exemplary embodiment.

FIG. 15 is a block diagram illustrating an apparatus for switching a bandwidth part according to an exemplary embodiment. The apparatus may be applied to a terminal. A base station may be configured to configure at least one BWP for the terminal. The apparatus is configured to execute the method for switching a bandwidth part illustrated in FIG. 5. As illustrated in FIG. 15, the apparatus may include a second receiving module 151 and a second switching module 152.

The second receiving module 151 is configured to receive a power saving signal transmitted by the base station. The power saving signal is a go-to-sleep signal (GTS).

The second switching module 152 is configured to perform the BWP switching based on the power saving signal.

It can be seen from the embodiments, by receiving the power saving signal transmitted by the base station, in which the power saving signal is the WUS, and by performing the BWP switching based on the power saving signal, the function of performing the BWP switching based on the power saving signal configured by the base station is realized, the rate of the BWP switching is improved, and the power consumption of the BWP switching is reduced.

Figure 16:
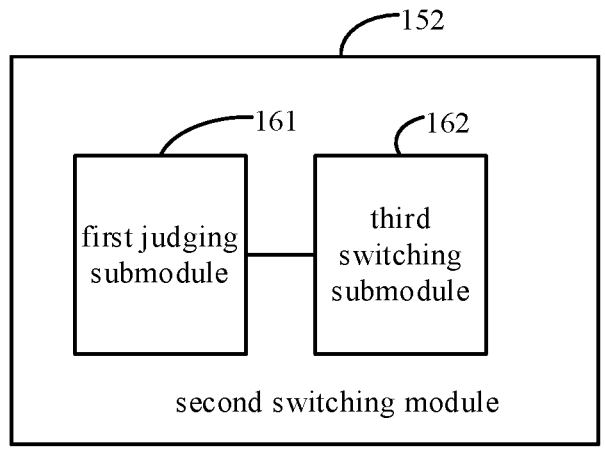
FIG. 16 is a block diagram illustrating another apparatus for switching a bandwidth part according to an exemplary embodiment.

In some embodiments, based on the apparatus illustrated in FIG. 15, the power saving signal is the go-to-sleep signal GTS. As illustrated in FIG. 16, the second switching module 152 may include a first judging submodule 161 and a third switching submodule 16.

The first judging submodule 161 is configured to determine whether the BWP inactivity timer is in a running state when the terminal is configured with a BWP inactivity timer.

The third switching submodule 16 is configured to not restart the BWP inactivity timer when determining that the BWP inactivity timer is in a running state, and return from the currently activated BWP to a default BWP or an initial BWP upon the BWP inactivity timer expiring.

It can be seen from the embodiments, when the power saving signal is the GTS and a BWP inactivity timer is configured for the terminal, it may be determined whether the BWP inactivity timer is in a running state. In a case where the BWP inactivity timer is in a running state, the BWP inactivity timer is not restarted, and the terminal returns from the currently activated BWP to a default BWP or an initial BWP upon the BWP inactivity timer expiring. In a case where the BWP inactivity timer is not in a running state, the terminal returns from the currently activated BWP to a default BWP or an initial BWP. Therefore, the BWP switching may be achieved in a scenario where the terminal is configured with a BWP inactivity timer, thereby improving the practicality of the BWP switching.

Figure 17:
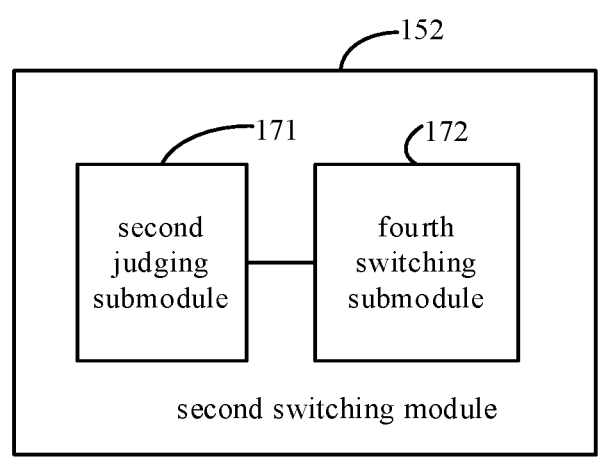
FIG. 17 is a block diagram illustrating another apparatus for switching a bandwidth part according to an exemplary embodiment.

In some embodiments, based on the apparatus illustrated in FIG. 15, the power saving signal is the go-to-sleep signal GTS. As illustrated in FIG. 17, the second switching module 152 may include a second judging submodule 171 and a fourth switching submodule 172.

The second judging submodule 171 is configured to determine whether the BWP inactivity timer is in a running state when the terminal is configured with a BWP inactivity timer.

The fourth switching submodule 172 is configured to terminal the BWP inactivity timer when determining that the BWP inactivity timer is in a running state, and determine that the BWP inactivity timer expires such that the currently activated BWP is switched to a default BWP or an initial BWP.

It can be seen from the embodiments, when the power saving signal is the GTS and the terminal is configured with a BWP inactivity timer, it may be determined whether the BWP inactivity timer is in a running state. In a case where the BWP inactivity timer is in a running state, the BWP inactivity timer is terminated and the currently activated BWP is switched to a default BWP or an initial BWP. In a case where the BWP inactivity timer is not in a running state, the terminal returns from the currently activated BWP to a default BWP or an initial BWP. Therefore, the implementation of the BWP switching is expanded, thereby meeting different individual requirements of the BWP switching.

Figure 18:
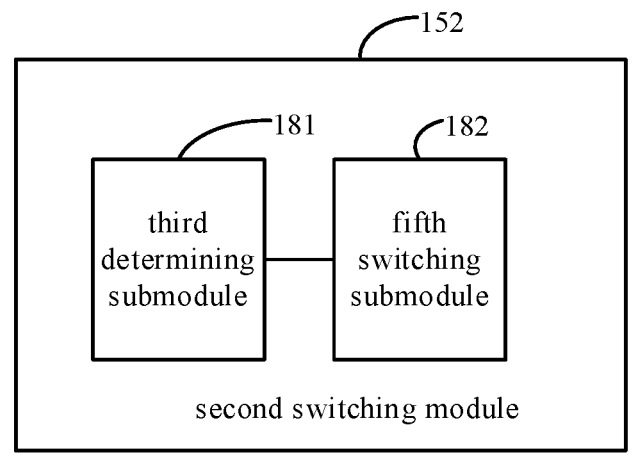
FIG. 18 is a block diagram illustrating another apparatus for switching a bandwidth part according to an exemplary embodiment.

In some embodiments, based on the apparatus illustrated in FIG. 15, the power saving signal is the go-to-sleep signal GTS. As illustrated in FIG. 18, the GTS includes second information for representing a second designated BWP. The second designated BWP is a target BWP for returning and configured by the base station for the terminal. The second switching module 152 may include a third determining submodule 181 and a fifth switching submodule 182.

The third determining submodule 181 is configured to determine the second designated BWP for returning based on the second information.

The fifth switching submodule 182 is configured to return from the currently activated BWP to the second designated BWP.

It can be seen from the embodiments, when the power saving signal is the GTS and the GTS includes the second information for representing the second designated BWP, the second designated BWP for returning may be determined based on the second information, and the terminal may return from the currently activated BWP to the second designated BWP. Therefore, the function of switching from the currently activated BWP to a BWP designated by the base station based on the configuration from the base station may be realized and the reliability of the BWP switching may be improved.

Figure 19:
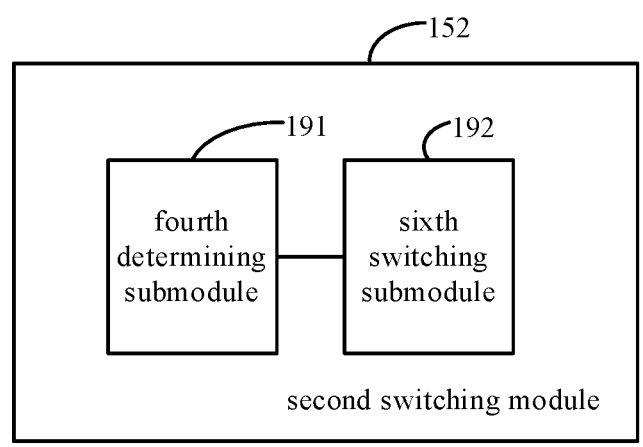
FIG. 19 is a block diagram illustrating another apparatus for switching a bandwidth part according to an exemplary embodiment.

In some embodiments, based on the apparatus illustrated in FIG. 15, the power saving signal is the go-to-sleep signal GTS. As illustrated in FIG. 19, the second switching module 152 may include a fourth determining submodule 191 and a sixth switching submodule 192.

The fourth determining submodule 191 is configured to determine the second target BWP for returning based on a second setting rule when the terminal is not configured with a BWP inactivity timer. The second setting rule is transmitted by the base station to the terminal through system messages or dedicated signaling, or is specified based on a communication protocol and written in the terminal in a form of firmware.

The sixth switching submodule 192 is configured to return the terminal from the currently activated BWP to the second target BWP.

In some embodiments, based on the apparatus illustrated in FIG. 19, the setting rule may include at least one of the following: the second target BWP being a default BWP; the second target BWP being an initial BWP; the second target BWP being an initial BWP when the terminal is not configured with the default BWP; and the second target BWP being the default BWP when the terminal is configured with the default BWP.

It can be seen from the embodiments, when the terminal is not configured with a BWP inactivity timer, the second target BWP for returning may be determined based on the second setting rule. For example, the second setting rule may be transmitted by the base station to the terminal through system messages or dedicated signaling, or is specified based on the communication protocol and written in the terminal in the form of firmware. The terminal may return from the currently activated BWP to a second target BWP. Thus, the BWP switching may be achieved in a scenario where the terminal is not configured with a BWP inactivity timer, thereby expanding the application scope of the BWP switching.

Figure 20:
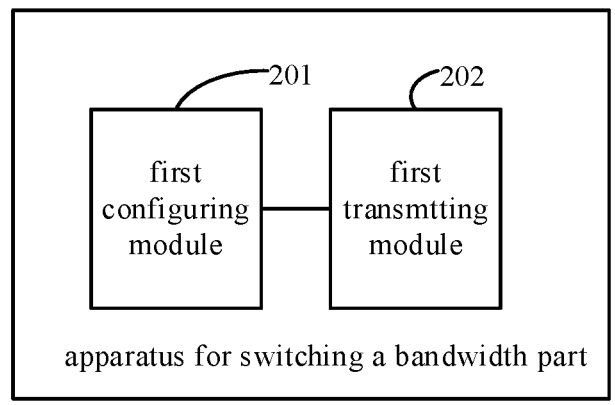
FIG. 20 is a block diagram illustrating an apparatus for switching a bandwidth part according to an exemplary embodiment.

FIG. 20 is a block diagram illustrating an apparatus for switching a bandwidth part according to an exemplary embodiment. The apparatus may be applied to a base station. The base station is configured to configure at least one BWP for the terminal. The apparatus is configured to execute the method for switching a bandwidth part illustrated in FIG. 10. As illustrated in FIG. 20, the apparatus may include a first configuring module 201 and a first transmitting module 202.

The first configuring module 201 is configured to configure a power saving signal for the terminal when determining that it is required to instruct the terminal to perform the BWP switching. The power saving signal is a wake up signaling WUS.

The first transmitting module 202 is configured to transmit the power saving signal to the terminal, to allow the terminal to perform the BWP switching based on the power saving signal.

In some embodiments, based on the apparatus illustrated in FIG. 20, the power saving signal is the wake up signaling WUS. The WUS includes the first information for representing the first designated BWP. The first designated BWP is a target BWP for switching and configured by the base station for the terminal.

It can be seen from some embodiments that the power saving signal may be configured for the terminal when determining that it is required to instruct the terminal to perform the BWP switching. The power saving signal is the WUS. The power saving signal may be transmitted to the terminal. The terminal may perform the BWP switching based on the power saving signal transmitted by the base station. The function of performing the BWP switching based on the power saving signal configured by the base station is realized, the rate of the BWP switching is improved, and the power consumption of the BWP switching is reduced.

Figure 21:
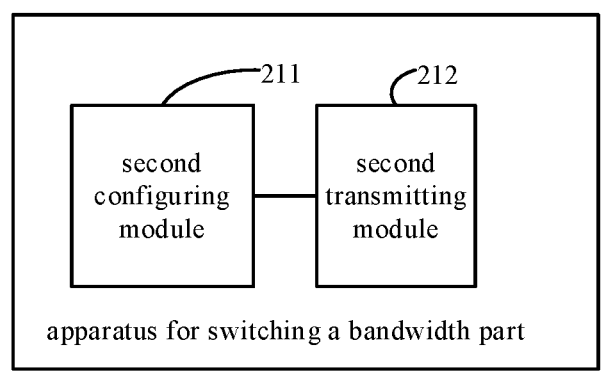
FIG. 21 is a block diagram illustrating an apparatus for switching a bandwidth part according to an exemplary embodiment.

FIG. 21 is a block diagram illustrating an apparatus for switching a bandwidth part according to an exemplary embodiment. The apparatus may be applied to a base station. The base station is configured to configure at least one BWP for the terminal. The apparatus is configured to execute the method for switching a bandwidth part illustrated in FIG. 11. As illustrated in FIG. 21, the apparatus may include a second configuring module 211 and a first transmitting module 212.

The second configuring module 211 is configured to configure a power saving signal for the terminal when determining that it is required to instruct the terminal to perform the BWP switching. The power saving signal is a go-to-sleep signal GTS.

The first transmitting module 212 is configured to transmit the power saving signal to the terminal, to allow the terminal to perform the BWP switching based on the power saving signal.

In some embodiments, based on the apparatus illustrated in FIG. 21, the power saving signal is the go-to-sleep signal GTS. The GTS includes second information for representing a second designated BWP. The second designated BWP is a target BWP for returning and configured by the base station for the terminal.

It can be seen from some embodiments that the power saving signal may be configured for the terminal when determining that it is required to instruct the terminal to perform the BWP switching. The power saving signal is the GTS. The power saving signal is transmitted to the terminal, and the terminal may perform the BWP switching based on the power saving signal transmitted by the base station. Therefore, the function of performing the BWP switching based on the power saving signal configured by the base station is realized, the rate of the BWP switching is improved, and the power consumption of the BWP switching is reduced.

As for the apparatus embodiments, since they basically correspond to the method embodiments, related descriptions may refer to corresponding descriptions of the method embodiments. The apparatus embodiments described above are merely illustrative, where the units described as separate components may or may not be physically separated, and the components displayed as units may or may not be physical units, that is, they may be located in one place, or may be distributed to multiple network units. Some or all of the modules may be selected according to actual needs to achieve the purpose of solutions of the disclosure. Those skilled in the art may understand and implement the methods without creative work.

Correspondingly, there is provided a non-transitory computer-readable storage medium having computer programs stored thereon. The computer programs are configured to execute any one of the methods for switching a bandwidth part as illustrate in FIG. 1 to FIG. 4.

Correspondingly, there is provided a non-transitory computer-readable storage medium having computer programs stored thereon. The computer programs are configured to execute any one of the methods for switching a bandwidth part as illustrated in FIG. 5 to FIG. 9.

Correspondingly, there is provided a non-transitory computer-readable storage medium having computer programs stored thereon. The computer programs are configured to execute the method for switching a bandwidth part as illustrated in FIG. 10.

Correspondingly, there is provided a non-transitory computer-readable storage medium having computer programs stored thereon. The computer programs are configured to execute the method for switching a bandwidth part as illustrated in FIG. 11.

Correspondingly, there is provided a device for switching a bandwidth part, applied to a terminal. A base station is configured to configure at least one bandwidth part BWP for the terminal. The device includes a processor and a memory configured to store instructions executable by the processor.

The processor is configured to receive a power saving signal transmitted by the base station, in which the power saving signal is a wake up signaling WUS, and perform BWP switching based on the power saving signal.

Correspondingly, there is provided a device for switching a bandwidth part, applied to a terminal. A base station is configured to configure at least one bandwidth part BWP for the terminal. The apparatus includes a processor and a memory configured to store instructions executable by the processor.

The processor is configured to receive a power saving signal transmitted by the base station, in which the power saving signal is a go-to-sleep signal GTS; and perform BWP switching based on the power saving signal.

Figure 22:
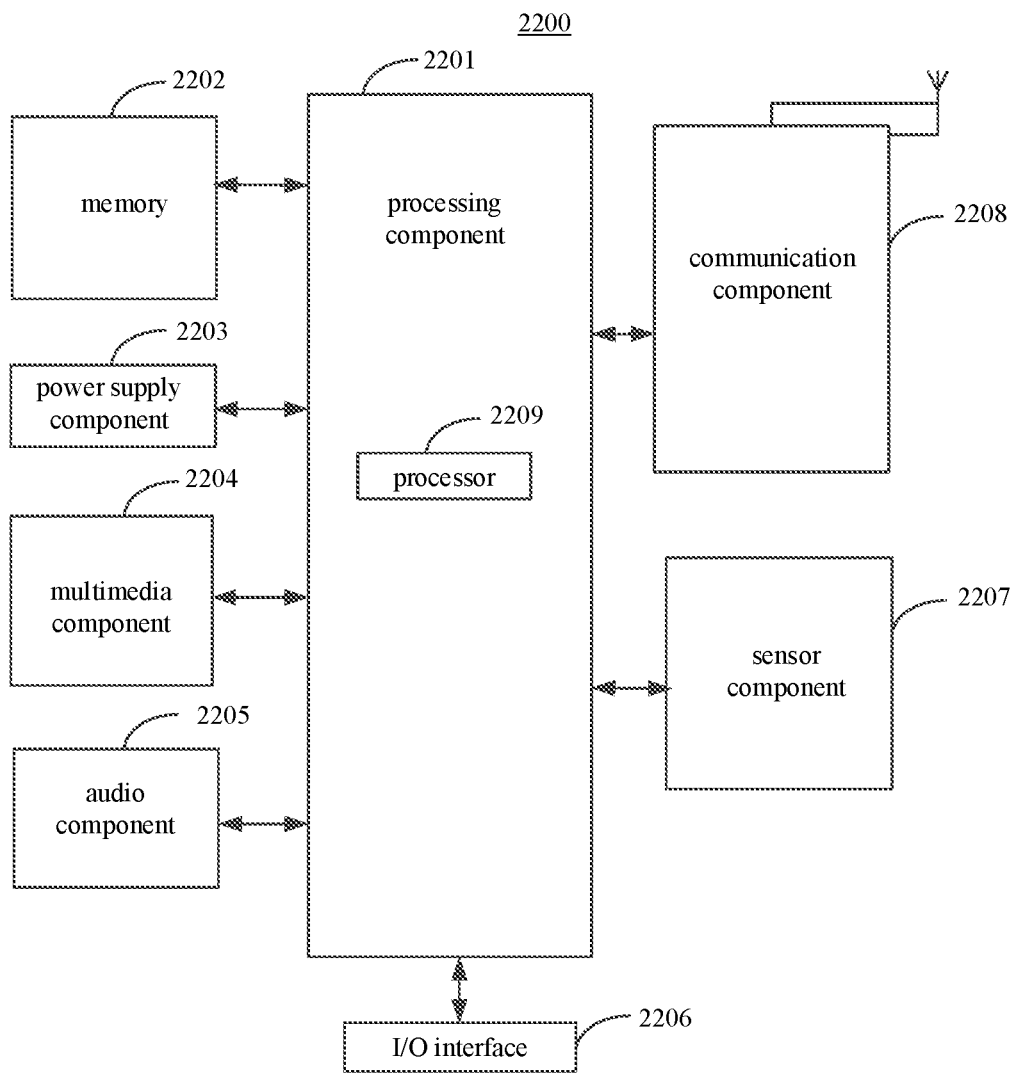
FIG. 22 is a schematic diagram illustrating an apparatus for switching a bandwidth part according to an exemplary embodiment.

FIG. 22 is a schematic diagram illustrating an apparatus for switching a bandwidth part according to an exemplary embodiment. As illustrated in FIG. 22, there is provided an apparatus 2200 for switching a bandwidth part according to an exemplary embodiment. The apparatus 2200 may be a computer, a mobile phone, a digital broadcasting terminal, a messaging device, a game console, a tablet device, a medical device, a fitness device, a personal digital assistant, and the like.

As illustrated in FIG. 22, the apparatus 2200 may include one or more of the following components: a processing component 2201, a memory 2202, a power supply component 2203, a multimedia component 2204, an audio component 2205, an input/output (I/O) interface 2206, a sensor component 2207, and a communication component 2208.

The processing component 2201 typically controls overall operations of the apparatus 2200, such as the operations associated with display, telephone calls, data communications, camera operations, and recording operations. The processing component 2201 may include one or more processors 2209 to execute instructions to perform all or part of the steps in the above described methods. Besides, the processing component 2201 may include one or more modules which facilitate the interaction between the processing component 2201 and other components. For example, the processing component 2201 may include a multimedia module to facilitate the interaction between the multimedia component 2204 and the processing component 2201.

The memory 2202 is configured to store various types of data to support operations of the apparatus 2200. Examples of such data include instructions for any applications or methods operated on the apparatus 2200, contact data, phone book data, messages, pictures, video, etc. The memory 2202 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 2203 provides power to various components of the apparatus 2200. The power supply component 2203 may include a power management system, one or more power supplies, and other components associated with the generation, management, and distribution of power in the apparatus 2200.

The multimedia component 2204 includes a screen providing an output interface between the apparatus 2200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2204 includes a front camera and/or a rear camera. The front camera and/or the rear camera may receive external multimedia data while the apparatus 2200 is in an operation mode, such as a photographing mode or a video mode. Each of the front camera and the rear camera may be a fixed optical lens system or have focus and optical zoom capability.

The audio component 2205 is configured to output and/or input audio signals. For example, the audio component 2205 includes a microphone (MIC), configured to receive external audio signals when the apparatus 2200 is in an operation mode, such as a call mode, a recording mode, and a voice recognition mode. The received audio signal may be further stored in the memory 2202 or transmitted via the communication component 2208. In some embodiments, the audio component 2205 further includes a speaker to output audio signals.

The I/O interface 2206 provides an interface between the processing component 2201 and the peripheral interface modules, such as a keyboard, a click wheel, buttons, and the like. The buttons may include, but are not limited to, a home button, a volume button, a starting button, and a locking button.

The sensor component 2207 includes one or more sensors to provide status assessments of various aspects of the apparatus 2200. For example, the sensor component 2207 may detect an open/closed status of the apparatus 2200, relative positioning of components, e.g., the display and the keypad of the apparatus 2200, a change in position of the apparatus 2200 or a component of the apparatus 2200, a presence or absence of user contact with the apparatus 2200, an orientation or an acceleration/deceleration of the apparatus 2200, and a change in temperature of the apparatus 2200. The sensor component 2207 may include a proximity sensor, configured to detect the presence of nearby objects without any physical contact. The sensor component 2207 may also include a light sensor, such as a CMOS or CCD image sensor, for use in imaging applications. In some embodiments, the sensor component 2207 may also include an accelerometer sensor, a gyroscope sensor, a magnetic sensor, a pressure sensor, or a temperature sensor.

The communication component 2208 is configured to facilitate communication, wired or wirelessly, between the apparatus 2200 and other devices. The apparatus 2200 can access a wireless network based on a communication standard, such as WiFi, 2G, 3G, 4G, 5G, or a combination thereof. In one exemplary embodiment, the communication component 2208 receives a broadcast signal or broadcast associated information from an external broadcast management system via a broadcast channel. In one exemplary embodiment, the communication component 2208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2202, executable by the processor 2209 in the apparatus 2202, for performing the above described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the apparatus 2200 can execute any one of the methods for switching a bandwidth part.

Correspondingly, there is provided an apparatus for switching a bandwidth part, applied to a base station. The base station is configured to configure at least one bandwidth part BWP for the terminal. The apparatus includes a processor and a memory configured to store instructions executable by the processor.

The processor is configured to configure a power saving signal for the terminal when determining that it is required to instruct the terminal to perform BWP switching, in which the power saving signal is a WUS; and transmit the power saving signal to the terminal to allow the terminal to perform the BWP switching based on the power saving signal.

Correspondingly, there is provided an apparatus for switching a bandwidth part, applied to a base station. The base station is configured to configure at least one bandwidth part BWP for the terminal. the apparatus includes a processor and a memory configured to store instructions executable by the processor.

The processor is configured to configure a power saving signal for the terminal when determining that it is required to instruct the terminal to perform BWP switching, in which the power saving signal is a GTS; and transmit the power saving signal to the terminal, to allow the terminal to perform the BWP switching based on the power saving signal.

Figure 23:
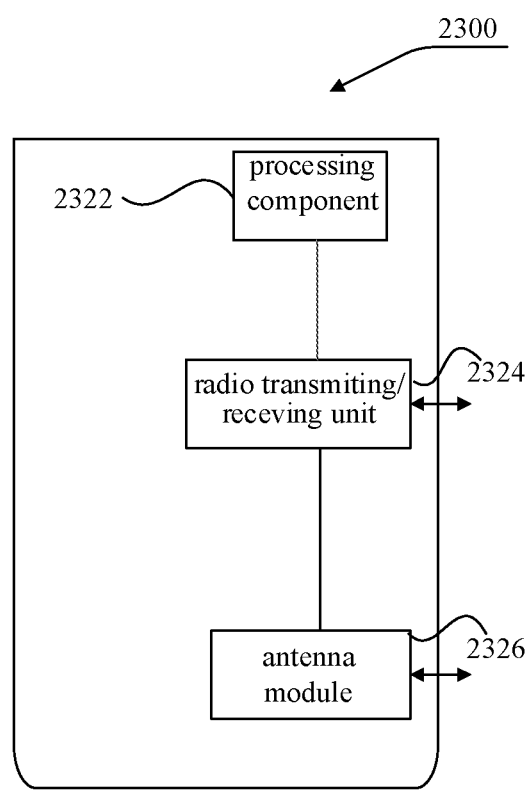
FIG. 23 is a schematic diagram illustrating an apparatus for switching a bandwidth part according to an exemplary embodiment.

As illustrated in FIG. 23, FIG. 23 is a schematic diagram illustrating an apparatus for switching a bandwidth part according to an exemplary embodiment. The apparatus 2300 may be provided as a base station. As illustrated in FIG. 23, the apparatus 2300 includes a processing component 2322, a radio transmitting/receiving unit 2324, an antenna module 2326, and a signal processing part especially for wireless interface. The processing component 2322 may further include one or more processors.

A processor in the processing module 2322 may be configured to execute any one of the methods for switching a bandwidth part.

Other embodiments of the disclosure will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for switching a bandwidth part, applied to a terminal, wherein a base station configures at least one bandwidth part (BWP) for the terminal, and the method comprises:
receiving a power saving signal transmitted by the base station, the power saving signal being a wake up signaling (WUS), and the WUS being configured to instruct to perform a BWP switching; and
performing the BWP switching based on the power saving signal;
wherein performing the BWP switching based on the power saving signal comprises:
in response to the WUS not comprising first information for representing a first designated BWP, determining a first target BWP for switching based on a first setting rule, wherein the first setting rule is transmitted by the base station to the terminal through system messages or dedicated signaling; switching a currently activated BWP to the first target BWP; and performing at least one of physical downlink control channel (PDCCH) monitoring or physical downlink shared channel (PDSCH) monitoring on the first target BWP; and in response to the WUS comprising the first information for representing the first designated BWP, the first designated BWP being a target BWP for switching and configured by the base station for the terminal; determining the first designated BWP for switching based on the first information; switching the currently activated BWP to the first designated BWP; and performing at least one of PDCCH monitoring or PDSCH monitoring on the first designated BWP.

2. A method for switching a bandwidth part, applied to a terminal, wherein a base station configures at least one bandwidth part (BWP) for the terminal, and the method comprises:
receiving a power saving signal transmitted by the base station, the power saving signal being a go-to-sleep signal (GTS), and the GTS being configured to instruct to perform a BWP switching; and
performing BWP switching based on the power saving signal;
wherein performing the BWP switching based on the power saving signal comprises:
in response to the GTS not comprising second information for representing a second designated BWP, determining a second target BWP for returning based on a second setting rule when the terminal is not configured with a BWP inactivity timer, the second setting rule being transmitted by the base station to the terminal through system messages or dedicated signaling; and returning from a currently activated BWP to the second target BWP; and
in response to the GTS comprising the second information for representing the second designated BWP, the second designated BWP being a target BWP for returning and configured by the base station for the terminal; determining the second designated BWP for returning based on the second information; and returning from the currently activated BWP to the second designated BWP.

3. The method of claim 2, wherein performing the BWP switching based on the power saving signal comprises:
determining whether the BWP inactivity timer is in a running state when the terminal is configured with the BWP inactivity timer; and
not restarting the BWP inactivity timer, and returning from the currently activated BWP to a default BWP or an initial BWP upon the BWP inactivity timer expiring, when determining that the BWP inactivity timer is in a running state.

4. The method of claim 2, wherein switching BWP switching based on the power saving signal comprises:
determining whether the BWP inactivity timer is in a running state when the terminal is configured with the BWP inactivity timer; and
terminating the BWP inactivity timer, determining that the BWP inactivity timer expires and switching the currently activated BWP to a default BWP or an initial BWP when determining that the BWP inactivity timer is in a running state.

5. The method of claim 2, wherein the setting rule comprises at least one of the following:
the second target BWP being a default BWP;
the second target BWP being an initial BWP;
the second target BWP being an initial BWP when the terminal is not configured with the default BWP; and
the second target BWP being a default BWP when the terminal is configured with the default BWP.

6. A method for switching BWP, applied to a base station, wherein the base station configures at least one bandwidth part (BWP) for a terminal, the method comprises:
configuring a power saving signal for the terminal when determining that it is required to instruct the terminal to perform BWP switching, the power saving signal being a wake up signaling (WUS), and the WUS being configured to instruct to perform a BWP switching; and
transmitting the power saving signal to the terminal, to allow the terminal to perform the BWP switching based on the power saving signal;
wherein transmitting the power saving signal to the terminal, to allow the terminal to perform the BWP switching based on the power saving signal comprises:
transmitting the WUS signaling to the terminal, to allow the terminal, in response to the WUS not comprising first information for representing a first designated BWP, to determine a first target BWP for switching based on a first setting rule, wherein the first setting rule is transmitted by the base station to the terminal through system messages or dedicated signaling; to switch a currently activated BWP to the first target BWP; and to perform at least one of physical downlink control channel (PDCCH) monitoring or physical downlink shared channel (PDSCH) monitoring on the first target BWP; and
transmitting the WUS signaling to the terminal, to allow the terminal, in response to the WUS comprising the first information for representing the first designated BWP, to determine the first designated BWP for switching based on the first information; switch the currently activated BWP to the first designated BWP; and to perform at least one of PDCCH monitoring or PDSCH monitoring on the first designated BWP; wherein the first designated BWP being a target BWP for switching and configured by the base station for the terminal.

7. The method of claim 6, wherein the WUS comprises the first information for representing the first designated BWP, the first designated BWP being a target BWP for switching and configured by the base station for the terminal.

8. A method for switching BWP, applied to a base station, wherein the base station configures at least one bandwidth part (BWP) for a terminal, and the method comprises:
configuring a power saving signal for the terminal when determining that it is required to instruct the terminal to perform BWP switching, wherein the power saving signal is a go-to-sleep signal (GTS), and the GTS is configured to instruct to perform a BWP switching; and
transmitting the power saving signal to the terminal, to allow the terminal to perform the BWP switching based on the power saving signal;
wherein transmitting the power saving signal to the terminal, to allow the terminal to perform BWP switching based on the power saving signal comprises:
transmitting the GTS to the terminal to allow the terminal, in response to the GTS not comprising second information for representing a second designated BWP, to determine a second target BWP for returning based on a second setting rule when the terminal is not configured with a BWP inactivity timer, wherein the second setting rule is transmitted by the base station to the terminal through system messages or dedicated signaling; and to return from a currently activated BWP to the second target BWP; and
transmitting the GTS to the terminal to allow the terminal, in response to the GTS comprising the second information for representing the second designated BWP, to determine the second designated BWP for returning based on the second information; and to return from the currently activated BWP to the second designated BWP; wherein the second designated BWP is a target BWP for returning and configured by the base station for the terminal.

9. The method of claim 8, wherein the GTS comprises the second information for representing the second designated BWP, the second designated BWP being a target BWP for returning and configured by the base station for the terminal.

10. A device for switching a bandwidth part, applied to a terminal, wherein a base station configures at least one bandwidth part (BWP) for the terminal, and the device comprises:
a processor;
a memory configured to store instructions executable by the processor;
wherein the processor is configured to:
receive a power saving signal transmitted by the base station, the power saving signal being a wake up signaling (WUS), and the WUS being configured to instruct to perform a BWP switching; and
perform the BWP switching based on the power saving signal;
wherein the processor is configured to perform BWP switching based on the power saving signal by:
in response to the WUS not comprising first information for representing a first designated BWP, determining a first target BWP for switching based on a first setting rule, wherein the first setting rule is transmitted by the base station to the terminal through system messages or dedicated signaling; switching a currently activated BWP to the first target BWP; and performing at least one of physical downlink control channel (PDCCH) monitoring or physical downlink shared channel (PDSCH) monitoring on the first target BWP; and
in response to the WUS comprising the first information for representing the first designated BWP, the first designated BWP being a target BWP for switching and configured by the base station for the terminal; determining the first designated BWP for switching based on the first information; switching the currently activated BWP to the first designated BWP; and performing at least one of PDCCH monitoring or PDSCH monitoring on the first designated BWP.

11. A device for switching a bandwidth part, applied to a terminal, wherein a base station configures at least one bandwidth part (BWP) for the terminal, and the apparatus comprises:
a processor;
a memory configured to store instructions executable by the processor;
wherein the processor is configured to:
receive a power saving signal transmitted by the base station, the power saving signal being a go-to-sleep signal (GTS), and the GTS being configured to instruct to perform a BWP switching; and
perform the BWP switching based on the power saving signal;
wherein the processor is configured to perform the BWP switching based on the power saving signal by:
in response to the GTS not comprising second information for representing a second designated BWP, determining a second target BWP for returning based on a second setting rule when the terminal is not configured with a BWP inactivity timer, the second setting rule being transmitted by the base station to the terminal through system messages or dedicated signaling; and returning from a currently activated BWP to the second target BWP; and in response to the GTS comprising the second information for representing the second designated BWP, the second designated BWP being a target BWP for returning and configured by the base station for the terminal; determining the second designated BWP for returning based on the second information; and returning from the currently activated BWP to the second designated BWP.

12. A device for switching a bandwidth part, applied to a base station, wherein the base station configures at least one bandwidth part (BWP) for a terminal, and the apparatus comprises:

a processor;

a memory configured to store instructions executable by the processor;

wherein the processor is configured to:

configure a power saving signal for the terminal when determining that it is required to instruct the terminal to perform BWP switching, the power saving signal being a wake up signaling (WUS), and the WUS being configured to instruct to perform a BWP switching; and transmit the power saving signal to the terminal, to allow the terminal to perform the BWP switching based on the power saving signal;

wherein the processor is configured to transmit the WUS signaling to the terminal, to allow the terminal, in response to the WUS not comprising first information for representing a first designated BWP, to determine a first target BWP for switching based on a first setting rule, wherein the first setting rule is transmitted by the base station to the terminal through system messages or dedicated signaling; to switch a currently activated BWP to the first target BWP; and to perform at least one of physical downlink control channel (PDCCH) monitoring or physical downlink shared channel (PDSCH) monitoring on the first target BWP; and wherein the processor is configured to transmit the WUS signaling to the terminal, to allow the terminal, in response to the WUS comprising the first information for representing the first designated BWP, to determine the first designated BWP for switching based on the first information; switch the currently activated BWP to the first designated BWP; and to perform at least one of PDCCH monitoring or PDSCH monitoring on the first designated BWP; wherein the first designated BWP being a target BWP for switching and configured by the base station for the terminal.

13. A device for switching a bandwidth part, applied to a base station, wherein the base station configures at least one bandwidth part (BWP) for a terminal, and the apparatus comprises:

a processor;

a memory configured to store instructions executable by the processor;

wherein the processor is configured to:

configure a power saving signal for the terminal when determining that it is required to instruct the terminal to perform BWP switching, the power saving signal being a go-to-sleep signal (GTS), and the GTS being configured to instruct to perform a BWP switching; and transmit the power saving signal to the terminal, to allow the terminal to perform to BWP switching based on the power saving signal;

wherein the processor is configured to transmit the GTS to the terminal to allow the terminal, in response to the GTS not comprising second information for representing a second designated BWP, to determine a second target BWP for returning based on a second setting rule when the terminal is not configured with a BWP inactivity timer, wherein the second setting rule is transmitted by the base station to the terminal through system messages or dedicated signaling; and to return from a currently activated BWP to the second target BWP; and wherein the processor is configured to transmit the GTS to the terminal to allow the terminal, in response to the GTS comprising the second information for representing the second designated BWP, to determine the second designated BWP for returning based on the second information; and to return from the currently activated BWP to the second designated BWP; wherein the second designated BWP is a target BWP for returning and configured by the base station for the terminal.

14. The device of claim 11, wherein the processor is further configured to:

determine whether the BWP inactivity timer is in a running state when the terminal is configured with the BWP inactivity timer; and not restart the BWP inactivity timer, and returning from the currently activated BWP to a default BWP or an initial BWP upon the BWP inactivity timer expiring, when determining that the BWP inactivity timer is in a running state.

* * * * *